United States Patent
Daigaku

(10) Patent No.: US 10,029,737 B2
(45) Date of Patent: Jul. 24, 2018

(54) FLOOR PANEL

(71) Applicant: TOYOTA JIDOSHA KABUSHIKI KAISHA, Toyota-shi, Aichi-ken (JP)

(72) Inventor: Koichi Daigaku, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/612,545

(22) Filed: Jun. 2, 2017

(65) Prior Publication Data

US 2018/0099700 A1 Apr. 12, 2018

(30) Foreign Application Priority Data

Oct. 11, 2016 (JP) .................. 2016-200189

(51) Int. Cl.
*B62D 25/20* (2006.01)
*B62D 29/00* (2006.01)

(52) U.S. Cl.
CPC ........... *B62D 25/20* (2013.01); *B62D 29/007* (2013.01)

(58) Field of Classification Search
CPC .............................. B62D 25/20; B62D 29/007
USPC ....................................... 296/187.08, 193.07
See application file for complete search history.

(56) References Cited

U.S. PATENT DOCUMENTS

| | | | |
|---|---|---|---|
| 2004/0140690 A1* | 7/2004 | Watanabe | B62D 25/20 296/184.1 |
| 2005/0140179 A1* | 6/2005 | Morsch | B62D 25/2018 296/204 |
| 2014/0008938 A1* | 1/2014 | Busch | B62D 25/04 296/193.06 |
| 2014/0193659 A1* | 7/2014 | Lanzerath | B62D 25/20 428/600 |
| 2014/0367002 A1* | 12/2014 | Naitou | C21D 1/673 148/653 |
| 2016/0272254 A1* | 9/2016 | Wu | B62D 25/20 |
| 2016/0347205 A1* | 12/2016 | Cardone | B60N 2/015 |
| 2017/0247774 A1* | 8/2017 | Sachdev | B23K 26/38 |

FOREIGN PATENT DOCUMENTS

JP    2006-281912 A    10/2006

* cited by examiner

*Primary Examiner* — Jason S Morrow
(74) *Attorney, Agent, or Firm* — Oliff PLC

(57) ABSTRACT

A floor panel has: a floor panel main body whose central portion and both outer side portions in a vehicle transverse direction are joined together, and that is formed by plural plate members being joined together at the central portion and the both outer side portions in the vehicle transverse direction. Among the second joining portions, a position of a central joining portion at the central portion in the vehicle transverse direction of the floor panel main body is offset in the vehicle longitudinal direction with respect to positions of outer side joining portions at the both outer side portions in the vehicle transverse direction of the floor panel main body. A different-type member joining portion, which is formed by plate members being joined together, is provided at at least one of the central portion, one of the outer side portions, and another of the outer side portions.

6 Claims, 3 Drawing Sheets

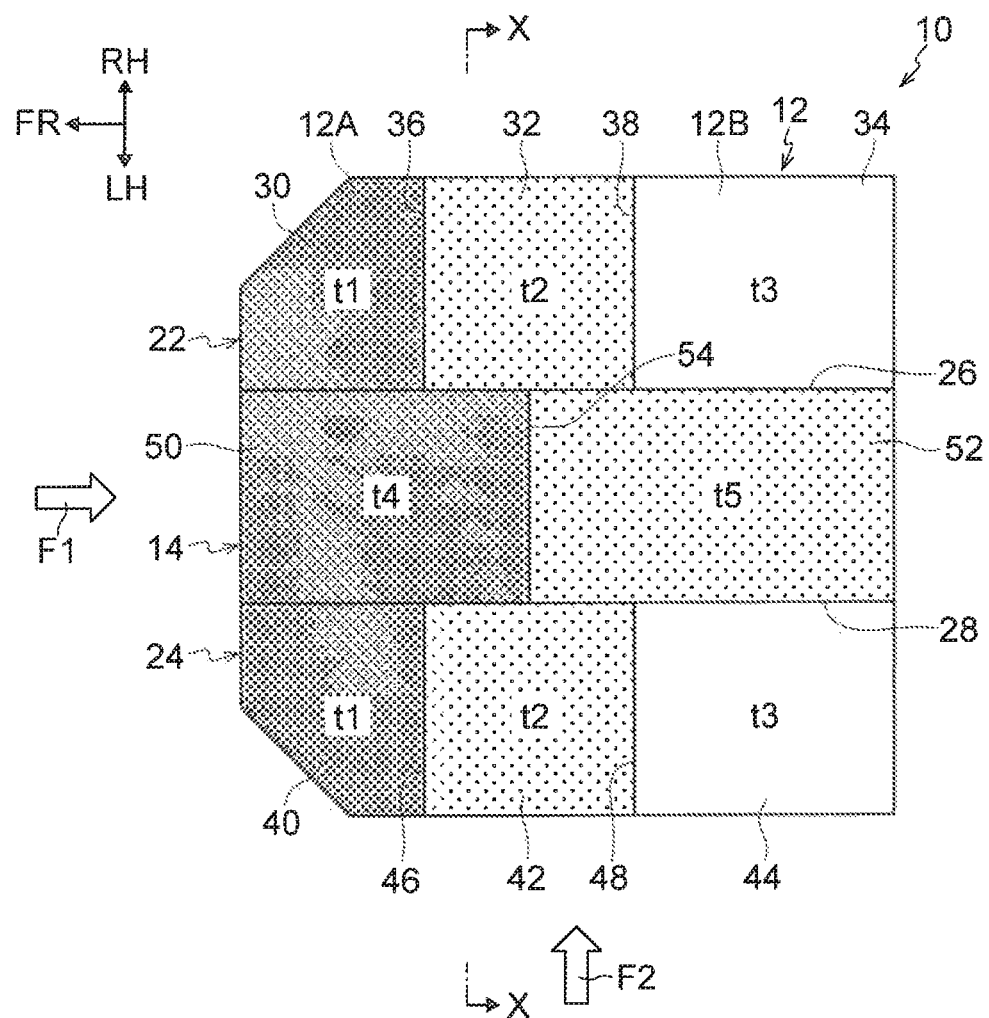

FLOOR PANEL

CROSS-REFERENCE TO RELATED APPLICATION

This application claims priority under 35 USC 119 from Japanese Patent Application No. 2016-200189 filed Oct. 11, 2016, the disclosure of which is incorporated by reference herein.

BACKGROUND

Technical Field

The present invention relates to a floor panel.

Related Art

Japanese Patent Application Laid-Open (JP-A) No. 2006-281912 discloses, in a reinforcing structure of a vehicle panel, a technique relating to a joined member (a floor panel) that is formed by joining together, by tailored blanking, plate members of different plate thicknesses. At this joined member, the joining portion between a plate member and a plate member is provided along the vehicle longitudinal direction. A panel member is mounted to the joined member along a direction intersecting the joining portion. In this prior art, due to the panel member being mounted to the joined member, stress that concentrates at the joining portion can be reduced at the joined member.

However, in the above-described prior art, the panel member must be mounted to the joined member, and therefore, the number of parts increases, and there are constraints on the design.

SUMMARY

In view of the above-described circumstances, the present invention provides a floor panel in which the number of parts can be reduced and that can ensure degrees of freedom in design.

A floor panel of a first aspect of the present invention has: a floor panel main body whose central portion and both outer side portions in a vehicle transverse direction are joined together in the vehicle transverse direction via first joining portions, and that is formed by plural plate members that are disposed in a vehicle longitudinal direction being joined together in the vehicle longitudinal direction via second joining portions at the central portion and the both outer side portions in the vehicle transverse direction, wherein, among the second joining portions, a position of a central joining portion at the central portion in the vehicle transverse direction of the floor panel main body is offset in the vehicle longitudinal direction with respect to positions of outer side, joining portions at the both outer side portions in the vehicle transverse direction of the floor panel main body, and a different-type member joining portion, which is formed by plate members at which at least one of rigidity or strength differs being joined together in the vehicle longitudinal direction, is provided at at least one of the central portion, one of the outer side portions, and another of the outer side portions in the vehicle transverse direction of the floor panel main body.

In the first aspect, the central portion and the both outer side portions in the vehicle transverse direction of the floor panel main body are joined together in the vehicle transverse direction via the first joining portions. The floor panel main body is formed by plural plate members, which are disposed in the vehicle longitudinal direction, being joined together in the vehicle longitudinal direction via the second joining portions at the central portion and the both outer side portions in the vehicle transverse direction of the floor panel main body.

Here, in the first aspect, among the second joining portions, the position of the central joining portion at the central portion in the vehicle transverse direction of the floor panel main body is offset in the vehicle longitudinal direction with respect to the positions of the outer side joining portions at the both outer side portions in the vehicle transverse direction of the floor panel main body. Therefore, a concentration of stress, in which stress concentrates at one place of the floor panel main body, can be mitigated.

If the position of the central joining portion at the central portion in the vehicle transverse direction of the floor panel, and the positions of the outer side joining portions at the both outer side portions in the vehicle transverse direction of the floor panel, were to be at the same position in the vehicle longitudinal direction, the central joining portion and the outer side joining portions would be provided so as to be continuous along the vehicle transverse direction of the floor panel.

In this case, at the time of a side collision of the vehicle, some of the collision load that is transmitted to the outer side portion in the vehicle transverse direction of the floor panel is transmitted in a rectilinear form along the vehicle transverse direction of the floor panel as seen in a plan view, in the manner of from the outer side joining portion of the one outer side portion (the collision side) in the vehicle transverse direction of the floor panel, via the central joining portion of the central portion in the vehicle transverse direction, to the outer side joining portion of the other outer side portion (the side opposite the collision side) in the vehicle transverse direction of the floor panel.

In contrast, in the first aspect, the position of the central joining portion at the central portion in the vehicle transverse direction of the floor panel (the floor panel main body) is offset in the vehicle longitudinal direction with respect to the positions of the outer side joining portions at the both outer side portions in the vehicle transverse direction of the floor panel. Namely, the central joining portion and the outer side joining portions of the floor panel are not continuous in the vehicle transverse direction of the floor panel.

Therefore, at the time of a side collision of the vehicle or the like, some of the collision load that is transmitted to one outer side portion in the vehicle transverse direction of the floor panel is transmitted along the vehicle transverse direction of the floor panel by the outer side joining portion, and thereafter, is dispersed in the vehicle longitudinal direction via the first joining portion at which the one outer side portion and the central portion in the vehicle transverse direction of the floor panel are joined. Namely, in the first aspect, as described above, a concentration of stress can be mitigated at the floor panel.

Due thereto, in the first aspect, plastic deformation of the floor panel at the time of a side collision of the vehicle can be suppressed. Accordingly, there is no need for a reinforcing member for mitigating the stress that concentrates at the second joining portion of the floor panel, and the number of parts can be reduced as compared with a case in which a reinforcing member is mounted to the floor panel.

Moreover, in the first aspect, the different-type member joining portion, at which plate members at which at least one of rigidity or strength differ are joined together in the vehicle longitudinal direction, is provided at at least one of the central portion, one outer side portion, and the other outer side portion in the vehicle transverse direction of the floor panel.

For example, at the floor panel, deformation of elastic regions, such as bending deformation or torsional deformation or the like, of the floor panel can be suppressed by increasing the rigidity. Due thereto, the rigidity can be varied freely in the vehicle longitudinal direction of the floor panel in accordance with the vibration characteristic of the floor panel, and therefore, the degrees of freedom in design improve.

On the other hand, at the floor panel, plastic deformation of the floor panel can be suppressed by increasing the strength. Due thereto, the number of parts can be reduced as compared with a case in which a reinforcing member is mounted to the floor panel. Therefore, the degrees of freedom in design can be improved by an amount corresponding to the amount by which the number of parts is reduced.

The "different-type member joining portion" here is explained. "Same-type members" means plate members whose rigidity or strength is the same, and "different-type members" means plate members whose rigidity or strength are different. Namely, the "different-type member joining portion" means a joining portion at which plate members that are different types of members are joined together. A joining portion at which plate members that are the same types of members are joined together is called a "same-type member joining portion".

In a floor panel of a second aspect of the present invention, in the first aspect, at least one of rigidity or strength of a front portion in the vehicle longitudinal direction of the floor panel main body is set to be higher than that of a rear portion in the vehicle longitudinal direction of the floor panel main body.

In the second aspect, for example, the rigidity of the front portion in the vehicle longitudinal direction of the floor panel (hereinafter simply called "the front portion of the floor panel") is set to be higher than the rigidity of the rear portion in the vehicle longitudinal direction of the floor panel (hereinafter simply called "the rear portion of the floor panel"). Due thereto, at the time of a front collision of the vehicle, deformation of elastic regions, such as bending deformation or torsional deformation or the like, that arises at the floor panel can be suppressed. Namely, at the time of a front collision of the vehicle, deformation of elastic regions, such as bending deformation or torsional deformation or the like, and plastic deformation can be suppressed.

Further, by setting the strength of the front portion of the floor panel to be higher than the strength of the rear portion of the floor panel, at the time of a front collision of the vehicle, plastic deformation of the floor panel can be suppressed, and the load transmitting efficiency along the vehicle longitudinal direction can be improved at the floor panel.

In a floor panel of a third aspect of the present invention, in the first aspect or the second aspect, a plate thickness of a first plate member, which is disposed at a front side in the vehicle longitudinal direction of the floor panel main body, is set to be thicker than a plate thickness of a second plate member that is disposed at a rear side in the vehicle longitudinal direction of the floor panel main body.

In the third aspect, the plate thickness of the first plate member, which is disposed at the front side in the vehicle longitudinal direction of the floor panel (hereinafter simply called "the front side of the floor panel"), is set to be thicker than the plate thickness of the second plate member that is disposed at the rear side in the vehicle longitudinal direction of the floor panel (hereinafter simply called "the rear side of the floor panel"). The rigidity of the first plate member is thereby higher than the rigidity of the second plate member. Due thereto, at the time of a front collision of the vehicle, deformation of elastic regions, such as bending deformation or torsional deformation or the like, of the floor panel can be suppressed. Namely, in the third aspect, some of the rigidity that is needed with respect to a front collision of the vehicle can be assured by the floor panel.

In a floor panel of a fourth aspect of the present invention, in any one of the first through third aspects, a third plate member, which is disposed at a front side in the vehicle longitudinal direction of the floor panel main body, is formed of a material of a higher tensile strength than a fourth plate member that is disposed at a rear side in the vehicle longitudinal direction of the floor panel main body.

In the fourth aspect, the third plate member, which is disposed at the front side of the floor panel, is formed of a material whose tensile strength (strength) is higher than that of the fourth plate member that is disposed at the rear side of the floor panel. Due thereto, the strength of the third plate member is higher than the strength of the fourth plate member.

Due thereto, at the time of a front collision of the vehicle, plastic deformation of the floor panel is suppressed, and the load transmitting efficiency along the vehicle longitudinal direction can be improved at the floor panel. Namely, in the fourth aspect, some of the strength that is needed with respect to a front collision of the vehicle can be assured by the floor panel. Note that, by making the plate thicknesses different at the third plate member and the fourth plate member, not only the strengths, but the rigidities also can be made to differ at the third plate member and the fourth plate member.

BRIEF DESCRIPTION OF THE DRAWINGS

Exemplary embodiments of the present invention will be described in detail based on the following figures, wherein:

FIG. 1 is a plan view showing a floor panel relating to a first embodiment;

DETAILED DESCRIPTION

Figure 2A:
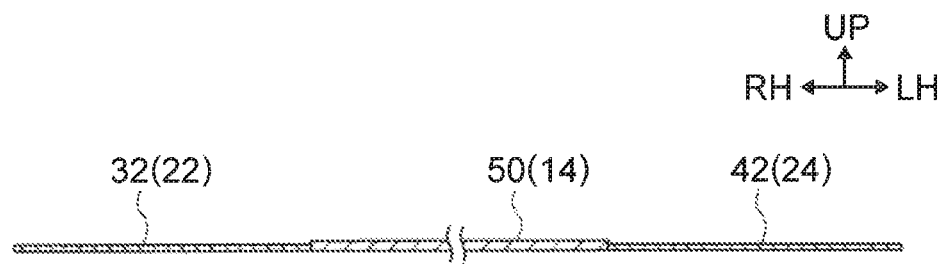
FIG. 2A is a cross-sectional view showing a state in which floor portions and a tunnel portion are joined together and made integral at the floor panel relating to the first embodiment.

Embodiments of a floor panel relating to the present invention are described hereinafter by using FIG. 1 through FIG. 3. Note that arrow FR, which is shown appropriately in the drawings, indicates the vehicle forward side, arrow UP indicates the vehicle upward side, arrow RH indicates the vehicle rightward direction, and arrow LH indicates the vehicle leftward direction. When explanation is given by merely using longitudinal, vertical and left-right directions hereinafter, they refer to the longitudinal of the vehicle longitudinal direction, the vertical of the vehicle vertical direction, and the left and right in the vehicle transverse direction when facing in the advancing direction, unless otherwise indicated.

First Embodiment (Structure of Floor Panel)
First, the structure of a floor panel relating to the first embodiment is described. A plan view of a floor panel 10 (floor panel main body 12) relating to the present embodiment is shown in FIG. 1. A cross-sectional view in which the floor panel 10 shown in FIG. 1 is cut along line X-X is shown in FIG. 2B.

Figure 2B:
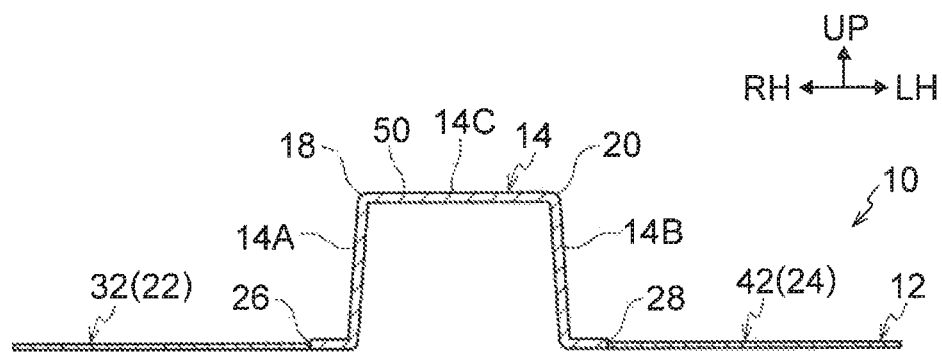
FIG. 2B is a view of the floor panel relating to the first embodiment after the structure of FIG. 2A has been press molded, and is a cross-sectional view cut along line X-X of FIG. 1.

The floor panel 10 that is shown in FIG. 1 and FIG. 2B is formed of steel plates for example, A tunnel portion 14 that projects-out toward the upper side is provided at the central portion in the vehicle transverse direction of the floor panel 10. The tunnel portion 14 extends along the vehicle longitudinal direction of the floor panel 10, and is formed substantially in the shape of a hat whose lower side is open, in a state of being cut along the vehicle transverse direction of the floor panel 10. The tunnel portion 14 is structured to include a vertical wall portion 14A and a vertical wall portion 14B that are disposed so as to face one another in the vehicle transverse direction, and an upper wall portion 14C that connects the upper ends of the vertical wall portions 14A, 14B. Ridgelines 18, 20 are formed at the upper wall portion 14C along the vehicle longitudinal direction.

On the other hand, floor portions 22, 24 that are flat-plate-shaped are provided at the both side portions that run along the vehicle transverse direction of the floor panel 10. The floor portions 22, 24 and the tunnel portion 14 are joined in the vehicle transverse direction by tailored blanking, and are made integral. Note that the joining portion of the tunnel portion 14 and the floor portion 22 (a first joining portion) is denoted by reference numeral 26 (and is called "joining portion 26" hereinafter), and the joining portion of the tunnel portion 14 and the floor portion 24 (a first joining portion) is denoted by reference numeral 28 (and is called "joining portion 28" hereinafter).

To briefly explain the method of manufacturing the floor panel 10, as shown in FIG. 2A, the floor portions 22, 24 and the tunnel portion 14 are joined together in the vehicle transverse direction via the joining portions 26, 28 along the vehicle longitudinal direction and are made integral, and, thereafter, are press molded as shown in FIG. 2B.

Note that the shapes of the floor portions and the tunnel portions are different before the press molding and after the press molding. Therefore, the floor portions 22, 24 and the tunnel portion 14 that are shown in FIG. 2A, and the floor portions 22, 24 and the tunnel portion 14 that are shown in FIG. 2B, are substantially different, but, for convenience of explanation, the same reference numerals are used therefor.

Further, in the present embodiment, as described above, after the floor portions 22, 24 and the tunnel portion 14 that are shown in FIG. 2A are joined in the vehicle transverse direction, they are press molded as shown in FIG. 2B. However, the method of manufacturing the floor panel 10 is not limited to this. For example, although not illustrated, the floor portions 22, 24 and the tunnel portion 14 may respectively be press molded, and thereafter, these members may be joined together and made integral. In the case of deep drawing, the plate thickness of the root portions of the tunnel portion 14 (the portions at the floor portion 22, 24 sides) becomes thin. Therefore, in order for the plate thickness of these portions to not become thin, some provision, such as making the plate thickness of these portions thick in advance, or the like, must be made. However, such a problem does not arise in a case in which the floor portions 22, 24 and the tunnel portion 14 are respectively press molded, and thereafter, are joined together.

Here, in the present embodiment, as shown in FIG. 1, at the floor panel 10, the floor portion 22 is divided into three portions in the vehicle longitudinal direction which are a front portion (a plate member) 30, a central portion (a plate member) 32, and a rear portion (a plate member) 34. The plate thicknesses of the steel plates are set to become thinner in the order of the front portion 30, the central portion 32, the rear portion 34. Further, the front portion 30 and the central portion 32 are joined in the vehicle longitudinal direction via an outer side joining portion (a different-type member joining portion) 36 that is a second joining portion, by tailored blanking. The central portion 32 and the rear portion 34 are joined in the vehicle longitudinal direction via an outer side joining portion (a different-type member joining portion) 38 that is a second joining portion, by tailored blanking (to be described later).

Further, in the same way as the floor portion 22, the floor portion 24 also is divided into three portions in the vehicle longitudinal direction which are a front portion (a plate member) 40, a central portion (a plate member) 42, and a rear portion (a plate member) 44. The plate thicknesses of the steel plates are set to become thinner in the order of the front portion 40, the central portion 42, the rear portion 44. Further, the front portion 40 and the central portion 42 are joined in the vehicle longitudinal direction via an outer side joining portion (a different-type member joining portion) 46 that is a second joining portion, by tailored blanking. The central portion 42 and the rear portion 44 are joined in the vehicle longitudinal direction via an outer side joining portion (a different-type member joining portion) 48 that is a second joining portion, by tailored blanking.

Note that the position of the outer side joining portion 36, which joins the front portion 30 and the central portion 32 of the floor portion 22, and the position of the outer side joining portion 46, which joins the front portion 40 and the central portion 42 of the floor portion 24, are set to be the same position in the vehicle longitudinal direction. Further, the position of the outer side joining portion 38, which joins the central portion 32 and the rear portion 34 of the floor portion 22, and the position of the outer side joining portion 48, which joins the central portion 42 and the rear portion 44 of the floor portion 24, are set to be the same position in the vehicle longitudinal direction. Further, although not illustrated, seats in which vehicle occupants sit are disposed respectively at the central portion 32 of the floor portion 22 and the central portion 42 of the floor portion 24.

Further, in the present embodiment, the front portion 30 of the floor portion 22 and the front portion 40 of the floor portion 24, and the central portion 32 of the floor portion 22 and the central portion 42 of the floor portion 24, and the rear portion 34 of the floor portion 22 and the rear portion 44 of the floor portion 24, are set so as to be steel plates of substantially the same plate thicknesses, respectively. For example, plate thickness (t1) of the front portions 30, 40 of the floor portions 22, 24 is set to be 1.4 mm, plate thickness (t2) of the central portions 32, 42 is set to be 1.0 mm, and plate thickness (t3) of the rear portions 34, 44 is set to be 0.65 mm.

On the other hand, the tunnel portion 14 is divided into two portions in the vehicle longitudinal direction which are a front portion (a plate member) 50 and a rear portion (a plate member) 52. Plate thickness (t4) of the steel plate that is the front portion 50 is set to be thicker than plate thickness (t5) of the steel plate that is the rear portion 52. For example, the plate thickness (t4) of the front portion 50 is set to be 1.4 mm, and the plate thickness (t5) of the rear portion 52 is set to be 1.0 mm. The front portion 50 and the rear portion 52 are joined in the vehicle longitudinal direction via a central joining portion (a different-type member joining portion) 54 that is a second joining portion, by tailored blanking.

Namely, the "different-type member joining portion" in the present embodiment means a joining portion in a case in which the plate thicknesses of the plate members that are adjacent in the vehicle longitudinal direction differ. Further, the "different-type member joining portion" in the present embodiment is generally called a so-called "different thickness joint".

Here, generally, in tailored blanking, plural metal plates (blanking members) that have different plate thicknesses or are different materials are welded by laser welding or the like and are made into one metal plate. For example, by using a different thickness joint at a press molded member of a vehicle body, the plate thickness can be increased by an amount corresponding to the amount needed for the rigidity. Further, in tailored blanking, plate members of different materials can be joined together, and, in this case, there is the feature that the characteristics of the material of a single plate member can be varied at portions thereof.

Further, as shown in FIG. 1, in the present embodiment, at the floor panel 10, the position of the central joining portion 54 of the tunnel portion 14 is set to be further toward the rear side than the position of the outer side joining portion 36 of the floor portion 22 and the outer side joining portion 46 of the floor portion 24, and is set to be further toward the front side than the position of the outer side joining portion 38 of the floor portion 22 and the outer side joining portion 48 of the floor portion 24.

Namely, the position of the central joining portion 54 of the tunnel portion 14 is offset in the vehicle longitudinal direction with respect to the position of the outer side joining portion 36 of the floor portion 22 and the position of the outer side joining portion 46 of the floor portion 24, respectively. Further, the position of the central joining portion 54 of the tunnel portion 14 is offset in the vehicle longitudinal direction with respect to the position of the outer side joining portion 38 of the floor portion 22 and the position of the outer side joining portion 48 of the floor portion 24, respectively.

(Operation and Effects of Floor Panel)

Operation and effects of the floor panel relating to the first embodiment are described next.

As shown in FIG. 1, in the present embodiment, at the floor portion 22 of the floor panel 10, the plate thickness (t1) of the front portion 30 is set to be thicker than the plate thicknesses (t2, t3 respectively) of the central portion 32, the rear portion 34. Further, at the floor portion 24 as well, in the same way as at the floor portion 22, the plate thickness (t1) of the front portion 40 is set to be thicker than the plate thicknesses (t2, t3 respectively) of the central portion 42, the rear portion 44. Moreover, the plate thickness (t4) of the front portion 50 of the tunnel portion 14 is set to be thicker than the plate thickness (t5) of the rear portion 52.

Generally, as the plate thickness of a steel plate becomes thicker, the rigidity thereof increases. Therefore, in the present embodiment, at the floor panel 10, the rigidity of a front portion 12A is set to be higher than that of a rear portion 12B. Due thereto, at the time of a front collision of the vehicle (not shown), even if collision load F1 is transmitted to the floor panel 10, deformation of elastic regions, such as bending deformation or torsional deformation or the like, of the floor panel 10 can be suppressed. Namely, in the present embodiment, at the vehicle, some of the rigidity that is needed at the time of a front collision can be assured by the floor panel 10.

By the way, although not illustrated, for example, in a case in which the positions of the joining portions between plate members at the floor portions of a floor panel are made to be positions that are the same, in the vehicle longitudinal direction, as the position of the joining portion between plate members at the tunnel portion, the joining portions of the floor portions and the joining portion of the tunnel portion are provided so as to be continuous along the vehicle transverse direction of the floor panel.

Therefore, at the time of a side collision of the vehicle, some of the collision load that is transmitted to a floor portion of the floor panel is transmitted in a rectilinear form along the vehicle transverse direction of the floor panel as seen in a plan view, in the manner of from the joining portion of the floor portion at the collision side via the joining portion of the tunnel portion to the joining portion of the floor portion that is positioned at the side opposite the collision side.

In contrast, in the present embodiment, as shown in FIG. 1, the position of the central joining portion 54 of the tunnel portion 14 is set so as to be further toward the rear side in the vehicle longitudinal direction than the position of the outer side joining portion 36 of the floor portion 22 and the outer side joining portion 46 of the floor portion 24. Namely, the position of the central joining portion 54 of the tunnel portion 14 is offset, in the vehicle longitudinal direction, with respect to the position of the outer side joining portion 36 of the floor portion 22 and the outer side joining portion 46 of the floor portion 24. Accordingly, at the floor panel 10, the position of the central joining portion 54 of the tunnel portion 14, and the position of the outer side joining portion 36 of the floor portion 22 and the outer side joining portion 46 of the floor portion 24, are not continuous along the vehicle transverse direction of the floor panel 10.

Therefore, in the present embodiment, at the time of a side collision or the like (a collision other than a front collision) of the vehicle, collision load F2 that is transmitted to the floor portion 24 is transmitted by the outer side joining portion 46 along the vehicle transverse direction of the floor panel 10, and thereafter, is dispersed in the vehicle longitudinal direction via the tunnel portion 14 that is disposed at the central portion in the vehicle transverse direction of the floor panel 10. Namely, in the present embodiment, at the floor panel 10, a concentration of stress can be mitigated.

In this way, in the present embodiment, at the floor panel 10, a concentration of stress at the time of a side collision of the vehicle can be mitigated, and therefore, plastic deformation of the floor panel 10 can be suppressed at the time of a side collision of the vehicle. Accordingly, there is no need for, for example, a reinforcing member for mitigating stress that concentrates at the outer side joining portion 46 of the floor panel 10.

Therefore, the number of parts can be reduced as compared with a case in which a reinforcing member is mounted to the floor panel, although not illustrated. Further, the degrees of freedom in design can be improved by an amount corresponding to the reduction in the number of parts. Further, production efficiency can be improved by the reduction in the number of parts. As a result, as shown in FIG. 1, at the floor panel 10 of the present embodiment, costs can be reduced.

Moreover, in the present embodiment, lightening of the weight of the vehicle can be devised and fuel efficiency can be improved, as compared with a case in which a reinforcing member is mounted to the floor panel 10. Further, in the present embodiment, because the rigidity can be varied freely in the vehicle longitudinal direction of the floor panel 10, the degrees of freedom in design with respect to the vibration characteristic of the floor panel 10 improve.

For example, in the present embodiment, at the floor portions 22, 24 of the floor panel 10, the rigidity is increased by an amount corresponding to the amount by which the plate thickness (t2) of the central portions 32, 42 is made thicker than the plate thickness (t3) of the rear portions 34, 44. Unillustrated seats are disposed at the central portions 32, 42 of the floor portions 22, 24, and vibrations that are smaller, to the extent possible, are more preferable for the vehicle occupants seated in the seats (the seated vehicle occupants).

Therefore, even if the rigidity at the central portions 32, 42 of the floor panel 10 is set to be lower than that at the front portions 30, 40, rigidity of a certain extent is required at the central portions 32, 42. Accordingly, here, the rigidity of the central portions 32, 42 of the floor panel 10 is set to be higher than the rigidity of the rear portions 34, 44 at which seats are not disposed.

Due thereto, the comfort of the ride for the seated vehicle occupants can be improved as compared with a case in which the rigidity of the central portions 32, 42 of the floor panel 10 is set to be the same as the rigidity of the rear portions 34, 44. Further, by increasing the rigidity of the floor panel 10, vibrations at the time of traveling of the vehicle can be suppressed, and, further, the handling stability of the vehicle can be improved.

On the other hand, as described above, in the present embodiment, the rigidity of the rear portions 34, 44 of the floor portions 22, 24 can be made to be lower than that of the central portions 32, 42. Accordingly, the plate thickness (t3) of the rear portions 34, 44 of the floor portions 22, 24 can be made to be thinner than the plate thickness (t2) of the central portions 32, 42, and lightening of the weight of the vehicle, by an amount corresponding to the amount by which the plate thickness is made thinner, can be devised.

Other Embodiments

Note that, in the present embodiment, description is given by using steel plates as an example of the plate members that are used at the floor panel 10, but the plate members are not limited to steel plates. For example, plate members that are formed of an aluminum alloy or the like may be used.

Further, in the present embodiment, as shown in FIG. 1, the position of the central joining portion 54 of the tunnel portion 14 is set to be further toward the rear side than the position of the outer side joining portions 36, 46 of the floor portions 22, 24. However, the present invention is not limited to this because it suffices for the position of the central joining portion 54 of the tunnel portion 14 to be offset in the vehicle longitudinal direction with respect to the position of the outer side joining portions 36, 46 of the floor portions 22, 24.

For example, as shown in FIG. 2B, the tunnel portion 14 is structured to include the pair of vertical wall portions 14A, 14B that face one another in the vehicle transverse direction, and the upper wall portion 14C that connects the upper ends thereof, and the ridgelines 18, 20 are formed along the vehicle longitudinal direction at the upper wall portion 14C. Namely, because the modulus of section of the tunnel portion 14 is larger than that of the floor portions 22, 24, the tunnel portion 14 has resistance with respect to bending deformation that runs along the height direction of the tunnel portion 14. In other words, because of the shape thereof, the tunnel portion 14 has higher rigidity than the floor portions 22, 24 with respect to bending deformation.

Therefore, the position of the central joining portion 54 of the tunnel portion 14 shown in FIG. 1 may be set to be further toward the front side than the position of the outer side joining portions 36, 46 of the floor portions 22, 24. Further, the plate thickness (t4) of the front portion 50 of the tunnel portion 14 may be set to be thinner than the plate thickness (t1) of the front portions 30, 40 of the floor portions 22, 24.

Moreover, the floor portions 22, 24 of the floor panel 10 do not necessarily have to be divided into three portions that are the front portions 30, 40, the central portions 32, 42, the rear portions 34, 44, respectively. For example, although not illustrated, the floor portions may be divided into two portions that are front portions and rear portions. Or, of the floor portion 22 and the floor portion 24, either one may be divided into three portions, and the other may be divided into two portions. Further, at the floor portions 22, 24, the position of the outer side joining portion 36 and the position of the outer side joining portion 46, and the position of the outer side joining portion 38 and the position of the outer side joining portion 48, are set to be the same position in the vehicle longitudinal direction respectively, but do not necessarily have to be limited to the same position.

Further, in the present embodiment, for example, the plate thickness (t1) of the front portion 30 of the floor portion 22 and the plate thickness (t1) of the front portion 40 of the floor portion 24 are set to be the same plate thickness, but the present invention is not limited to this. For example, in a case in which the driver sits in the seat that is at the floor portion 22 side, the plate thickness of the front portion 30 of the floor portion 22 may be set to be even thicker than the plate thickness of the front portion 40 of the floor portion 24. Because the steering wheel and the like are disposed at the driver's side, the rigidity of the front portion 30 of the floor portion 22 may be made to be even higher, and bending deformation and the like of the front portion 30 of the floor portion 22 may be suppressed further.

Moreover, in the present embodiment, plural plate members of differing plate thicknesses are used. However, by using plate members that have not only differing plate thicknesses but also differing tensile strengths as these plate members, not only the rigidity but the strength as well can be varied among the plate members, and therefore, the degrees of freedom in design increase more.

Second Embodiment (Structure of Floor Panel)

The structure of a floor panel relating to a second embodiment is described next. Note that structures that are substantially the same as those of the first embodiment are denoted by the same reference numerals, and description thereof is omitted.

Figure 3:
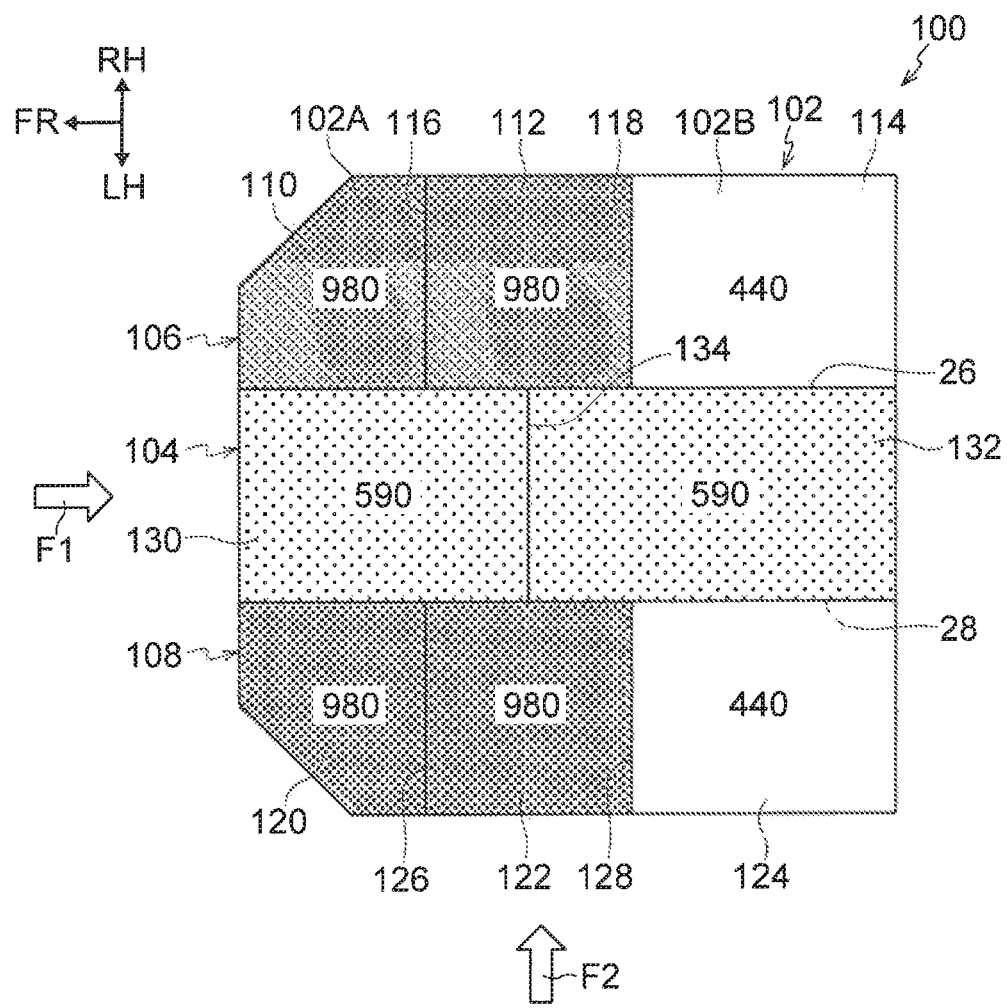
FIG. 3 is a plan view showing a floor panel relating to a second embodiment.

A plan view of a floor panel 100 (a floor panel main body 102) relating to the present embodiment is shown in FIG. 3. As shown in FIG. 3, the floor panel 100 is structured to include a tunnel portion 104 and floor portions 106, 108. The floor portion 106 is divided into three portions in the vehicle longitudinal direction that are a front portion (a plate member) 110, a central portion (a plate member) 112, a rear portion (a plate member) 114.

An ultrahigh tensile strength steel plate member whose tensile strength is 980 MPa for example is used at the front portion 110 and the central portion 112. A high tensile strength steel plate member whose tensile strength is 440 MPa is used at the rear portion 114. Further, the front portion 110 and the central portion 112 are joined in the vehicle longitudinal direction via an outer side joining portion (a same-type member joining portion) 116 that is a second joining portion, by tailored blanking. The central portion 112 and the rear portion 114 are joined in the vehicle longitudinal direction via an outer side joining portion (a different-type member joining portion) 118 that is a second joining portion, by tailored blanking.

Note that, in the present embodiment, a joining portion in a case in which the tensile strengths of plate members, which are adjacent in the vehicle longitudinal direction, differ from one another is called a "different-type member joining portion", and a joining portion in a case in which the tensile strengths of plate members, which are adjacent in the vehicle longitudinal direction, are the same is called a "same-type member joining portion".

Further, in the same way as the floor portion 106, the floor portion 108 also is divided along the vehicle longitudinal direction into three portions that are a front portion (a plate member) 120, a central portion (a plate member) 122, a rear portion (a plate member) 124. An ultrahigh tensile strength steel plate member whose tensile strength is 980 MPa for example is used at the front portion 120 and the central portion 122. A high tensile strength steel plate member whose tensile strength is 440 MPa is used at the rear portion 124. Further, the front portion 120 and the central portion 122 are joined in the vehicle longitudinal direction via an outer side joining portion (a same-type member joining portion) 126 that is a second joining portion, by tailored blanking. The central portion 122 and the rear portion 124 are joined in the vehicle longitudinal direction via an outer side joining portion (a different-type member joining portion) 128 that is a second joining portion, by tailored blanking.

On the other hand, the tunnel portion 104 is divided along the vehicle longitudinal direction into two portions which are a front portion (a plate member) 130 and a rear portion (a plate member) 132. High tensile strength steel plate members whose tensile strength is 590 MPa are used at the front portion 130 and the rear portion 132. The front portion 130 and the rear portion 132 are joined in the vehicle longitudinal direction via a central joining portion (a same-type member joining portion) 134 that is a second joining portion, by tailored blanking.

Further, the position of the central joining portion 134 of the tunnel portion 104 is set so as to be further toward the rear side in the vehicle longitudinal direction than the position of the outer side joining portion 116 of the floor portion 106 and the outer side joining portion 126 of the floor portion 108, and is further toward the front side in the vehicle longitudinal direction than the position of the outer side joining portion 118 of the floor portion 106 and the outer side joining portion 128 of the floor portion 108.

Namely, the position of the central joining portion 134 of the tunnel portion 104 is offset in the vehicle longitudinal direction with respect to the position of the outer side joining portion 116 of the floor portion 106 and the position of the outer side joining portion 126 of the floor portion 108, respectively. Further, the position of the central joining portion 134 of the tunnel portion 104 is offset in the vehicle longitudinal direction with respect to the position of the outer side joining portion 118 of the floor portion 106 and the position of the outer side joining portion 128 of the floor portion 108, respectively.

(Operation and Effects of Floor Panel)
Operation and effects of the floor panel relating to the second embodiment are described next. Note that description is omitted of operation and effects that are substantially the same as those of the first embodiment.

As shown in FIG. 3, in the present embodiment, ultrahigh tensile strength steel plate members are used at the front portion 110 and the central portion 112 of the floor portion 106 of the floor panel 100, and the tensile strength thereof is set to be higher than that of the rear portion 114. Further, in the same way as the floor portion 106, at the floor portion 108 as well, ultrahigh tensile strength steel plate members are used at the front portion 120 and the central portion 122, and the tensile strength thereof is set to be higher than that of the rear portion 124. Moreover, plate members of the same material are used for the front portion 130 and the rear portion 132 of the tunnel portion 104, and high tensile strength steel plate members are used therefor.

Namely, in the present embodiment, at the floor portions 106, 108 of the floor panel 100, the strength of a front portion 102A is set to be higher than that of a rear portion 102B. Due thereto, at the time of a front collision of the vehicle (not illustrated), even if the collision load F1 is transmitted to the floor panel 100, plastic deformation of the floor panel 100 can be suppressed, and the load transmitting efficiency along the vehicle longitudinal direction at the floor panel 100 can be improved. Namely, in the present embodiment, at the vehicle, some of the strength that is needed at the time of a front collision can be assured by the floor panel 100.

Here, in the present embodiment, the strength of the front portions 110, 120 of the floor portions 106, 108 are set to be higher than the strength of the front portion 130 of the tunnel portion 104. Generally, although not illustrated, front side members are disposed along the vehicle longitudinal direction respectively at the vehicle transverse direction both outer sides at a power unit chamber, at the vehicle longitudinal direction front sides of the floor portions of the floor panel. Further, the floor portions 106, 108 are joined to the rear end portions of the pair of front side members at the power unit chamber, respectively.

Therefore, in a front collision of the vehicle, the collision load is transmitted to the front side members via a bumper reinforcement that is disposed along the vehicle transverse direction at the front end portion of the vehicle, and some of the collision load is transmitted to the floor portions 106, 108 via the front side members.

Accordingly, in the present embodiment, by using ultrahigh tensile strength steel plate members at the front portions 110, 120 of the floor portions 106, 108, in particular, plastic deformation of the floor portions 106, 108 is suppressed, and the load transmitting efficiency along the vehicle longitudinal direction of the floor portions 106, 108 can be improved. Note that the strength of the front portion 130 of the tunnel portion 104 may be set so as to be the same as the strength of the front portions 110, 120 of the floor portions 106, 108.

Further, in the present embodiment, a plate member of a tensile strength of 980 MPa is used as the ultrahigh tensile strength steel plate member, and plate members of tensile strengths of 590 MPa, 440 MPa are used as the high tensile strength steel plate members. However, the tensile strengths are not limited to this, and can be changed appropriately in accordance with the vehicle type or the like.

In the present invention, as described above in the first embodiment and the second embodiment, the floor panel is divided in the vehicle longitudinal direction, and the rigidity or strength can be adjusted by varying the plate thicknesses and the tensile strengths of the divisional plate members. Therefore, the degrees of freedom in design increase.

Further, the present invention is not limited to the above, and, other than the above, can of course be implemented by being modified in various ways within a scope that does not depart from the gist thereof.

What is claimed is:

1. A floor panel comprising:
a floor panel main body whose central portion and both outer side portions in a vehicle transverse direction are joined together in the vehicle transverse direction via first joining portions, and that is formed by a plurality of plate members that are disposed in a vehicle longitudinal direction being joined together in the vehicle longitudinal direction via second joining portions at the central portion and the both outer side portions in the vehicle transverse direction,
wherein, among the second joining portions, a position of a central joining portion at the central portion in the vehicle transverse direction of the floor panel main body is offset in the vehicle longitudinal direction with respect to positions of outer side joining portions at the both outer side portions in the vehicle transverse direction of the floor panel main body, and
a different-type member joining portion, which is formed by plate members at which at least one of rigidity or strength differs being joined together in the vehicle longitudinal direction, is provided at at least one of the central portion, one of the outer side portions, and another of the outer side portions in the vehicle transverse direction of the floor panel main body.

2. The floor panel of claim 1, wherein at least one of rigidity or strength of a front portion in the vehicle longitudinal direction of the floor panel main body is set to be higher than that of a rear portion in the vehicle longitudinal direction of the floor panel main body.

3. The floor panel of claim 1, wherein a plate thickness of a first plate member, which is disposed at a front side in the vehicle longitudinal direction of the floor panel main body, is set to be thicker than a plate thickness of a second plate member that is disposed at a rear side in the vehicle longitudinal direction of the floor panel main body.

4. The floor panel of claim 3, wherein a third plate member, which is disposed at a front side in the vehicle longitudinal direction of the floor panel main body, is formed of a material of a higher tensile strength than a fourth plate member that is disposed at a rear side in the vehicle longitudinal direction of the floor panel main body.

5. The floor panel of claim 1, wherein, among the second joining portions, the position of the central joining portion is set to be further toward a rear side than the positions of the outer side joining portions.

6. The floor panel of claim 1, wherein, among the second joining portions, the position of the central joining portion is set to be further toward a front side than the positions of the outer side joining portions, and a plate thickness of a first plate member, which is disposed at a front side in the vehicle longitudinal direction of the floor panel main body, is set to be thinner than a plate thickness of a second plate member that is disposed at a rear side in the vehicle longitudinal direction of the floor panel main body.

* * * * *